(12) United States Patent
Mita et al.

(10) Patent No.: US 9,266,729 B2
(45) Date of Patent: Feb. 23, 2016

(54) FUEL PROCESSOR

(75) Inventors: Yuki Mita, Osaka (JP); Masaki Nobuoka, Nara (JP); Masatoshi Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 289 days.

(21) Appl. No.: 13/978,832

(22) PCT Filed: Aug. 29, 2012

(86) PCT No.: PCT/JP2012/005416
§ 371 (c)(1),
(2), (4) Date: Jul. 9, 2013

(87) PCT Pub. No.: WO2013/073083
PCT Pub. Date: May 23, 2013

(65) Prior Publication Data
US 2013/0294976 A1    Nov. 7, 2013

(30) Foreign Application Priority Data

Nov. 16, 2011  (JP) .................................. 2011-250204

(51) Int. Cl.
| | | |
|---|---|---|
| *C01B 3/32* | (2006.01) | |
| *C01B 3/48* | (2006.01) | |
| *H01M 8/06* | (2006.01) | |
| *C01B 3/38* | (2006.01) | |

(Continued)

(52) U.S. Cl.
CPC . *C01B 3/32* (2013.01); *B01J 8/008* (2013.01); *B01J 8/0469* (2013.01); *B01J 8/0496* (2013.01); *C01B 3/384* (2013.01); *C01B 3/48* (2013.01); *H01M 8/0618* (2013.01); *B01J 2208/0053* (2013.01); *B01J 2208/00504* (2013.01); *B01J 2208/00884* (2013.01); *B01J 2208/025* (2013.01); *C01B 2203/0233* (2013.01);

(Continued)

(58) Field of Classification Search
CPC . B01J 8/0257; B01J 2208/0084; C01B 3/384; C01B 3/48; C01B 3/32; C01B 2203/00504; C01B 2203/0053; C01B 2203/00884; C01B 2203/025; C01B 2203/0233
See application file for complete search history.

(56) References Cited

U.S. PATENT DOCUMENTS 5,718,881 A * 2/1998 Sederquist et al. ........... 423/652
7,077,997 B1 * 7/2006 Sandacz ........................ 422/144

(Continued)

FOREIGN PATENT DOCUMENTS

JP          01-320201       12/1989
JP          03-265502       11/1991

(Continued)

*Primary Examiner* — Matthew Merkling
(74) *Attorney, Agent, or Firm* — Hamre, Schumann, Mueller & Larson, P.C.

(57) ABSTRACT

An object of the present invention is to provide a fuel processor that can reduce reforming catalyst deterioration caused by thermal deformation of a structure. The fuel processor includes a reformer 8 that is fed with fuel gas 70 to refine hydrogen-rich reformed gas 73 by a reaction of a reforming catalyst 7. A plurality of partition plates 20 for dividing the reforming catalyst 7 are provided in a space filled with the reforming catalyst 7 between an internal cylinder 18 and an external cylinder 19. All the partition plates 20 are cantilevered from the external cylinder, preventing the partition plates 20 from coming into contact with each other in temperature variations. This can reduce deterioration such as crushing or powdering that is caused by a compressive stress of the reforming catalyst 7.

8 Claims, 11 Drawing Sheets

(51) Int. Cl.
   *B01J 8/04* (2006.01)
   *B01J 8/00* (2006.01)

(52) U.S. Cl.
   CPC ... *C01B2203/0283* (2013.01); *C01B 2203/047* (2013.01); *C01B 2203/0435* (2013.01); *C01B 2203/066* (2013.01); *C01B 2203/82* (2013.01); *Y02E 60/50* (2013.01)

(56) References Cited

U.S. PATENT DOCUMENTS 7,883,675 B2  2/2011  Nakamura et al.

2009/0258263 A1  10/2009  Fujioka et al.
2011/0250102 A1  10/2011  Sakai

FOREIGN PATENT DOCUMENTS

| JP | 08-208202 | 8/1996 |
| JP | 4536153 B | 9/2010 |
| JP | 2010-235403 | 10/2010 |
| JP | 2011-206648 | 10/2011 |
| WO | WO 96/15850 | 5/1996 |
| WO | WO 2007/040146 | 4/2007 |
| WO | WO 2009/150792 | 12/2009 |

* cited by examiner

FIG. 1

- ROOM TEMPERATURE STATE -

- SHUTDOWN -

- COMPARATIVE EXAMPLE -

FUEL PROCESSOR

TECHNICAL FIELD

The present invention relates to a fuel processor that steam reforms hydrocarbon fuel gas such as city gas and LPG to manufacture hydrogen-rich reformed gas, and is used for fuel treatment for a fuel cell power generator and so on.

BACKGROUND ART

Figure 10:
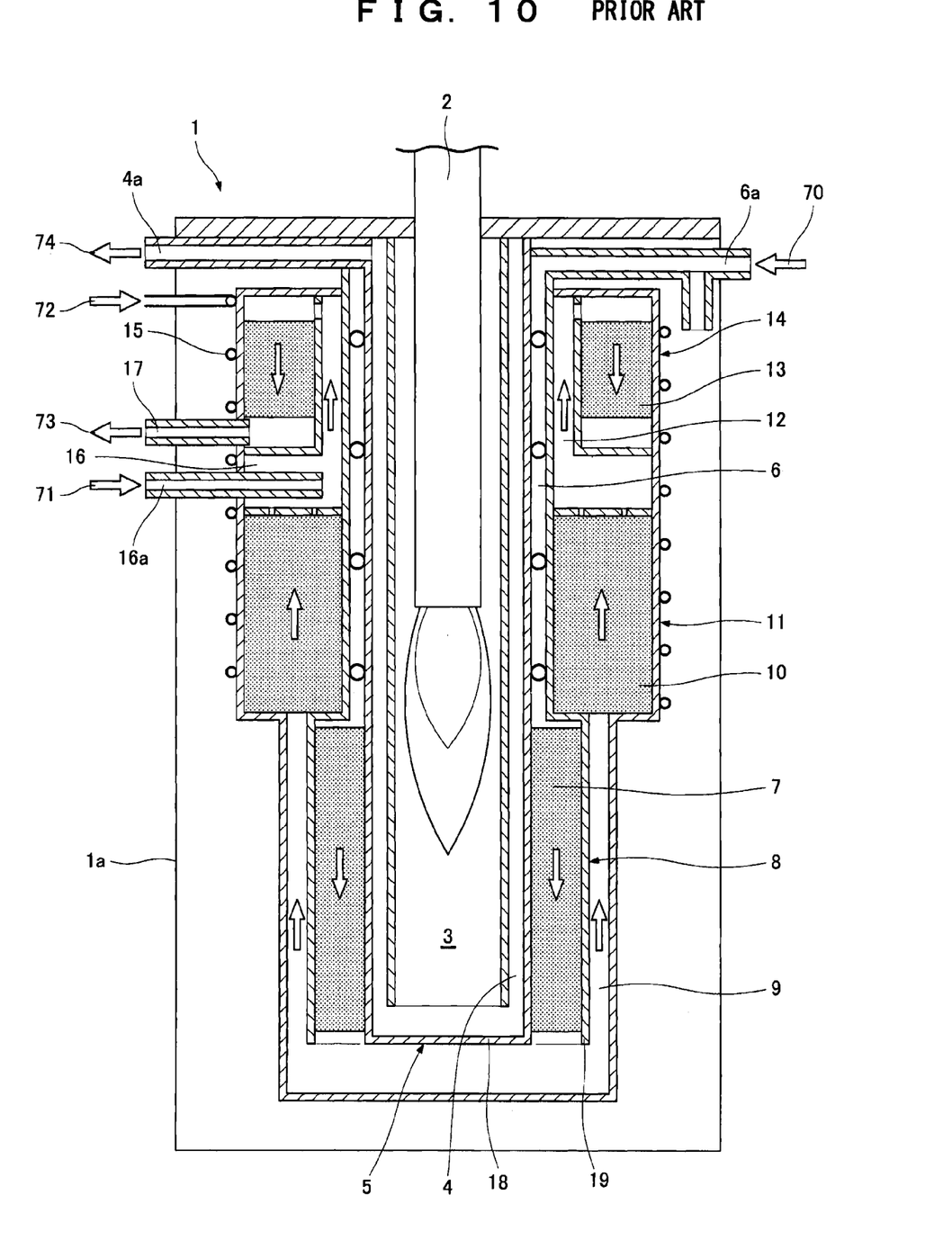
FIG. 10 is a longitudinal section illustrating a fuel processor according to the related art.
Figure 11:
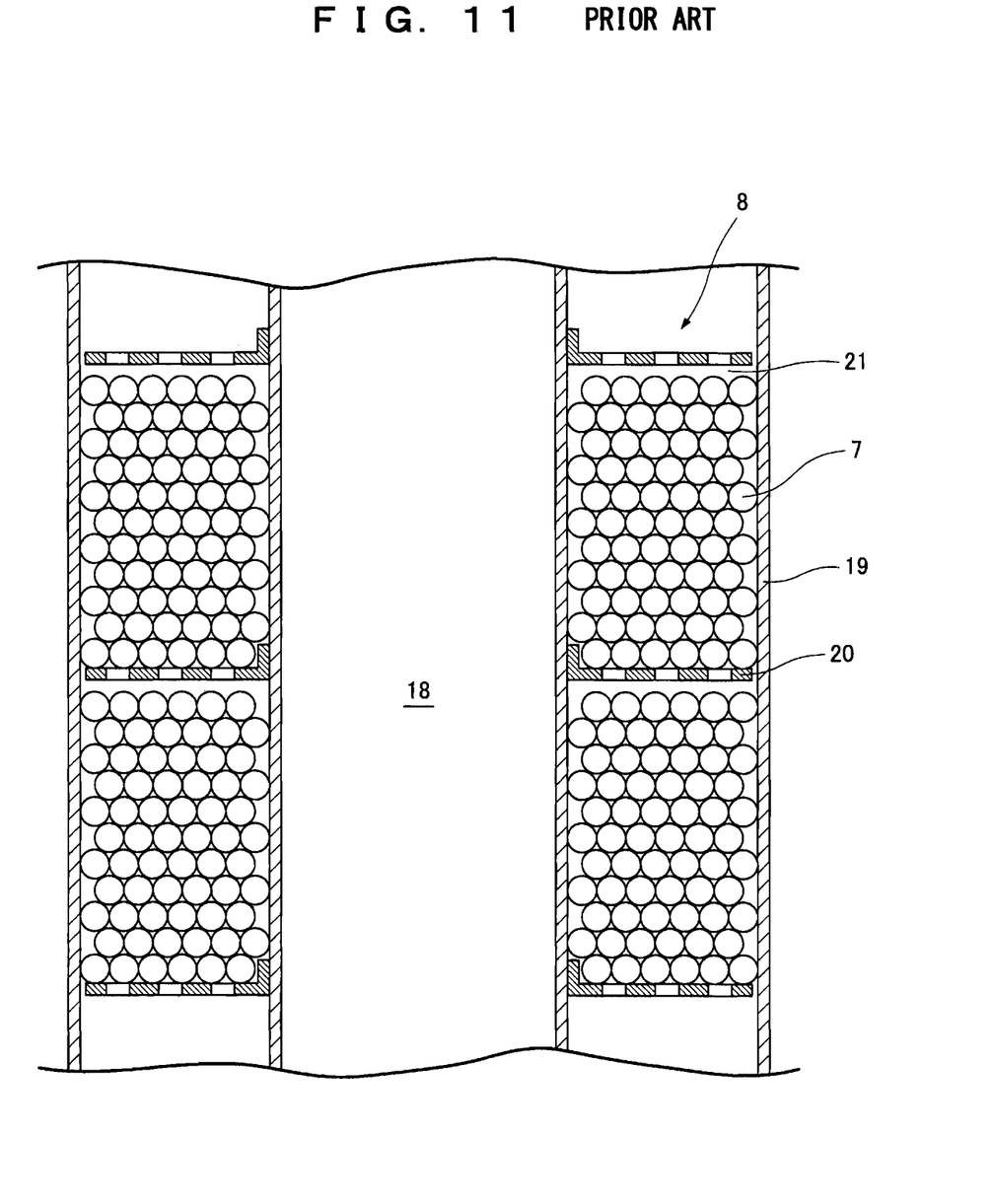
FIG. 11 is an enlarged view of a reformer in the fuel processor according to the related art.

FIGS. 10 and 11 show a fuel processor of Patent Literature 1. An arrow F indicates a direction of a gas flow.

A fuel processor 1 is entirely cylindrical and includes a heat insulator 1a that covers the outer surface of the fuel processor 1 to provide heat insulation. A heater 5 is provided at the center of the fuel processor 1 and includes a heat chamber 3 that contains a burner 2 and an exhaust gas passage 4 that surrounds the heat chamber 3. The exhaust gas passage 4 includes an outlet port 4a opened to the outside to discharge exhaust gas 74. Furthermore, a first gas passage 6 acting as an evaporator is disposed around the outlet side of the exhaust gas passage 4 of the heater 5. A reformer 8 filled with a reforming catalyst 7 is disposed around a part where hot exhaust gas flows from the heat chamber 3 to the exhaust gas passage 4. The reforming catalyst 7 is fed between an internal cylinder 18 and an external cylinder 19. The reformer 8 is surrounded by a second gas passage 9 that passes hydrogen containing gas from the reformer 8 to the outer surface of the first gas passage 6. Moreover, a converter 11 filled with a CO converter catalyst 10 is disposed near the reformer 8 on the outer surface of the first gas passage 6 while a CO remover 14 filled with a CO removal catalyst 13 is disposed far from the reformer 8 on the outer surface of the first gas passage 6 so as to be located outside a third gas passage 12 in a radial direction, the third gas passage 12 being disposed inside the CO remover 14 in the radial direction.

Fuel gas 70 is supplied into an inlet port 6a of the first gas passage 6. The supplied fuel gas 70 is mixed at the inlet port 6a with reformed water 72 supplied through a heating coil 15 wound around the converter 11 and the CO remover 14. The fuel gas 70 and the reformed water 72 are heated through the first gas passage 6 acting as an evaporator. The high-temperature fuel gas and steam are supplied to the reformer 8, and then the fuel gas is steam reformed by the action of the reforming catalyst 7 into hydrogen-rich gas.

The hydrogen containing gas fed from the reformer 8 is supplied to the converter 11 through the second gas passage 9, and then carbon monoxide (CO) in the hydrogen containing gas is reduced by the action of the CO converter catalyst 10. The hydrogen containing gas fed from the converter 11 is mixed with air 71, which is introduced from an air inlet port 16a, in an air mixing space 16 provided between the converter 11 and the third gas passage 12. The hydrogen containing gas mixed with the air 71 is supplied to the CO remover 14 through the third gas passage 12, CO is removed from the gas by the action of the CO removal catalyst 13, and then hydrogen containing gas 73 is fed from a hydrogen-containing-gas outlet port 17.

The third gas passage 12 is provided between the CO remover 14 and the first gas passage 6 at a high temperature. Thus, a temperature downstream of the converter 11 can be kept at an optimum temperature for a reaction (e.g., 200° C.); meanwhile, the inlet temperature of the CO remover 14 can be kept at a temperature (e.g., 150° C.) where an oxidation reaction is not excessively accelerated. In other words, the converter 11 and the CO remover 14 can be advantageously kept at a suitable temperature.

FIG. 11 is an enlarged view of the reformer 8 described in Patent Literature 1.

The reformer 8 contains the reforming catalyst 7 shaped like spherical or cylindrical particles that are fed by vibrations or the like with maximum density into a catalyst layer 21 surrounded by the internal cylinder 18, the external cylinder 19, and partition plates 20. The reformer 8 needs to have at least a certain length in the axial direction with respect to the width of the reformer 8 in the radial direction because a proper passage distance is necessary for completing a reforming reaction. Thus, the reformer 8 is relatively extended in the axial direction. A load caused by the weight of the reforming catalyst 7 increases toward the bottom of the reformer 8. Moreover, the thermal expansion of the external wall of the heater 5 in contact with the reforming catalyst 7 may cause deterioration, e.g., a crush of the reforming catalyst 7 under a pressure or powdering on the surface of the reforming catalyst 7. Thus, the partition plates 20 are provided at regular intervals in the axial direction to disperse the load of the weight of the reforming catalyst 7, preventing deterioration such as a crush. This configuration is described also in Patent Literature 2 and Patent Literature 4.

Figure 12:
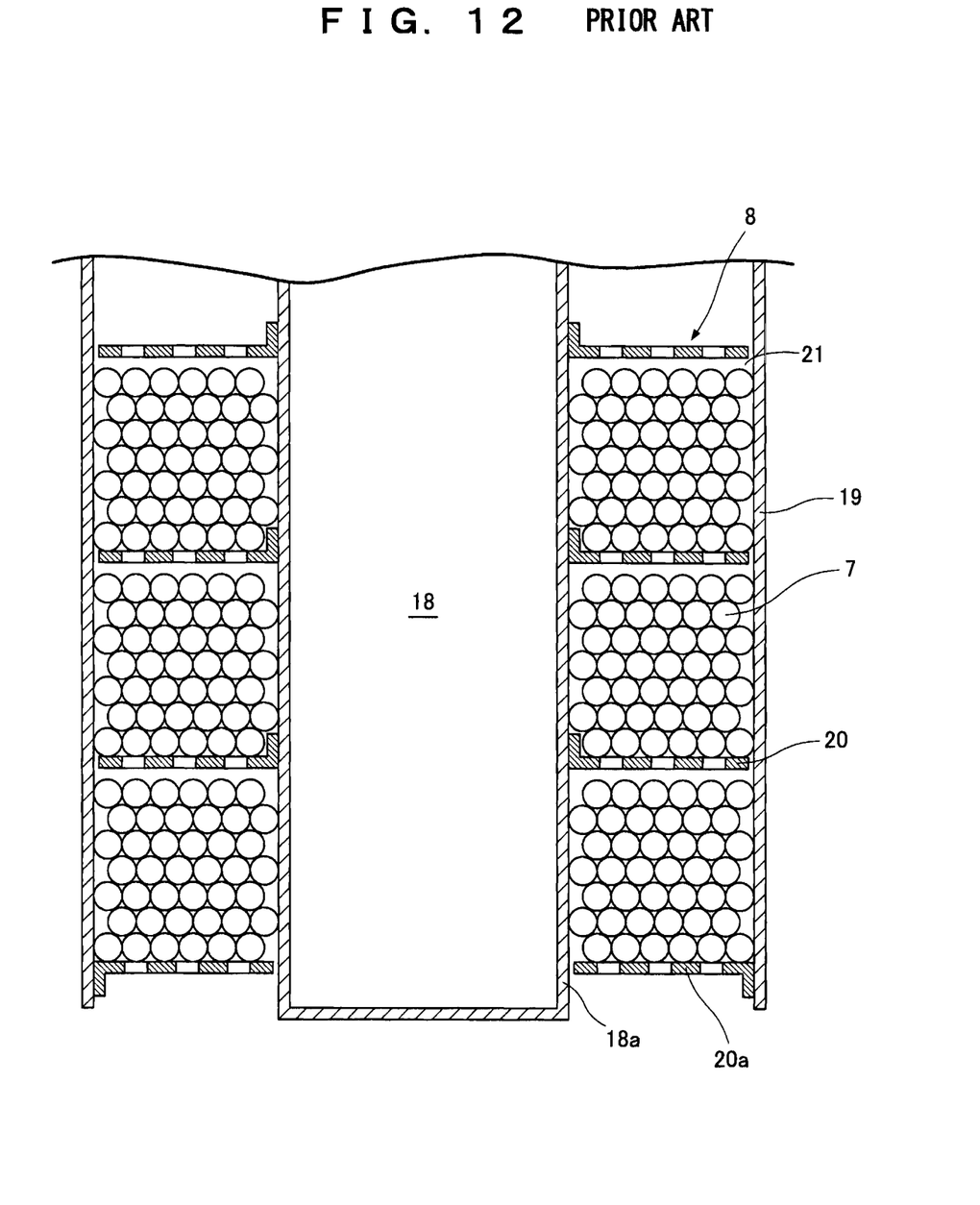
FIG. 12 is an enlarged view illustrating the reformer of the fuel processor in consideration of actual production.

FIG. 12 illustrates the structure of the reformer 8 of the fuel processor 1 in consideration of actual production.

When fuel gas is reformed into hydrogen-rich gas by steam reforming, the reformed gas can be efficiently refined by heating the reforming catalyst 7 to a desired temperature (e.g., 450° C. to 700° C.). Thus, the catalyst layer 21 is located near the bottom (high-temperature part) of the internal cylinder 18 so as to be easily heated by the heater 5. The partition plates 20 are attached by welding to the outer surface of the internal cylinder 18 other than a partition plate 20a at the bottom such that a welding torch can be set in the absence of the external cylinder 19 and heat is further transmitted from the heater 5 to the reforming catalyst 7. However, the temperature of a high-temperature part 18a of the internal cylinder 18 is increased to the maximum temperature (e.g., 750° C.) of the overall reformer 8. Thus, a fuel cell is repeatedly started and stopped so as to repeat thermal expansion and thermal shrinkage in a cycle of great temperature variations, resulting in a severe environment that is likely to cause a fatigue fracture on a welded part. The partition plate 20a attached at the bottom to the high-temperature part 18a of the internal cylinder 18 by welding may be dropped by a fatigue fracture in repeated operations. For example, in Patent Literature 3, the attachment of a reinforcing member to the partition plate is proposed to prevent a catalyst from dropping because the partition plate may drop the catalyst when being pressed down by the resistance of the catalyst during thermal shrinkage.

Hence, in the structure of FIG. 12, the end of the external cylinder 19 is located around the catalyst layer, and the partition plate 20a at the bottom is attached to the inner surface of the external cylinder 19 by welding. This allows the attachment of the welding torch enabling welding. Since the external cylinder 19 is set at a lower temperature than the internal cylinder 18, the partition plates 20 are less likely to drop.

CITATION LIST

Patent Literature

Patent Literature 1: Japanese Patent No. 4536153
Patent Literature 2: Japanese Patent Laid-Open No. 8-208202 ([0011])

Patent Literature 3: Japanese Patent Laid-Open No. 2010-235403 ([0004])
Patent Literature 4: WO2007/040146A1 ([0040])

SUMMARY OF INVENTION

Technical Problem

However, when the fuel processor in FIG. 12 is started, the internal cylinder 18, the external cylinder 19, and the partition plates 20 that form the catalyst layer 21 rise in temperature in various ways with various steady temperatures. Hence, after the fuel processor is started, a temperature difference occurs between the internal cylinder 18 and the external cylinder 19, causing a difference in thermal expansion. This may reduce a distance between the partition plates 20 from that of an initial state, depending on a lapse of time from the startup of the fuel processor.

Thus, the reforming catalyst 7 may be trapped in the catalyst layer 21 and crushed by a compressive stress. Even if the reforming catalyst 7 is not crushed, particles of the reforming catalyst 7 may be rubbed against each other into powder, leading to deterioration of catalyst performance.

Also when the fuel processor is stopped at the end of a steady operation, the catalyst layer 21 deformed by a temperature decrease of a structure may deteriorate the reforming catalyst 7. Furthermore, crushing and powering of the reforming catalyst 7 may cause clogging in a space between catalyst particles or an accumulation of the reforming catalyst 7 in a space under the catalyst layer 21. This may interfere with the passage of reformed gas so as to increase a pressure loss, insufficiently producing reformed gas.

To address the problem of the related art, an object of the present invention is to provide a fuel processor that can reduce deterioration of a reforming catalyst caused by a thermally deformed structure.

Solution to Problem

A fuel processor according to a first aspect of the present invention includes: a heater provided with an external cylinder outside an internal cylinder, the heater heating the interior of the internal cylinder; and a reformer filled with a reforming catalyst between the internal cylinder and the external cylinder, the fuel processor producing hydrogen-rich reformed gas by passing fuel gas to be reformed through the reformer by a reaction of the reforming catalyst, wherein the reformer filled with the reforming catalyst is divided by a plurality of spaced partition plates in a space between the internal cylinder and the external cylinder in the longitudinal direction of the internal cylinder and the external cylinder, and the outer edges of all the partition plates are cantilevered while being connected to the external cylinder.

A fuel processor according to a second aspect of the present invention, in the first aspect, wherein a clearance is formed between the partition plate and the internal cylinder.

A fuel processor according to a third aspect of the present invention, in the second aspect, wherein the clearance is larger than an amount of approach in the thermal expansion of the internal cylinder and the external cylinder, the thermal expansion being caused by temperature variations during the startup and shutdown of the fuel processor, and the clearance is smaller than a minimum grain size of the reforming catalyst.

A fuel processor according to a fourth aspect of the present invention, in the third aspect, wherein the clearance between the partition plate and the internal cylinder is larger near the high-temperature part of the internal cylinder than near the low-temperature part of the internal cylinder.

A fuel processor according to a fifth aspect of the present invention, in the first aspect, wherein the partition plate has a flange on a fixed part to the external cylinder, the flange being directed downstream in the flowing direction of the fuel gas to be reformed.

A fuel processor according to a sixth aspect of the present invention, in the fourth aspect, wherein the internal cylinder is tapered in side view so as to decrease in outside diameter toward the high-temperature part of the internal cylinder.

A fuel processor according to a seventh aspect of the present invention, in the fifth aspect, wherein the flange of the partition plate is entirely subjected to piecing welding onto the external cylinder.

Advantageous Effects of Invention

According to a fuel processor of the present invention, a reformer filled with the reforming catalyst is divided by partition plates in a space between an internal cylinder and an external cylinder. Since the outer edges of the partition plates are cantilevered while being connected to the external cylinder, the partition plates do not come close to each other in temperature variations. This can reduce crushing or powdering caused by the compressive stress of the reforming catalyst.

DESCRIPTION OF EMBODIMENTS

Referring to FIGS. 1 to 9, an embodiment of the present invention will be described below.

Components having the same functions as those of the fuel processor of the related art in FIGS. 10, 11, and 12 are indicated by the same reference numerals and the explanation thereof is omitted.

FIGS. 1 to 8 show a fuel processor according to a first embodiment of the present invention.

Figure 1:
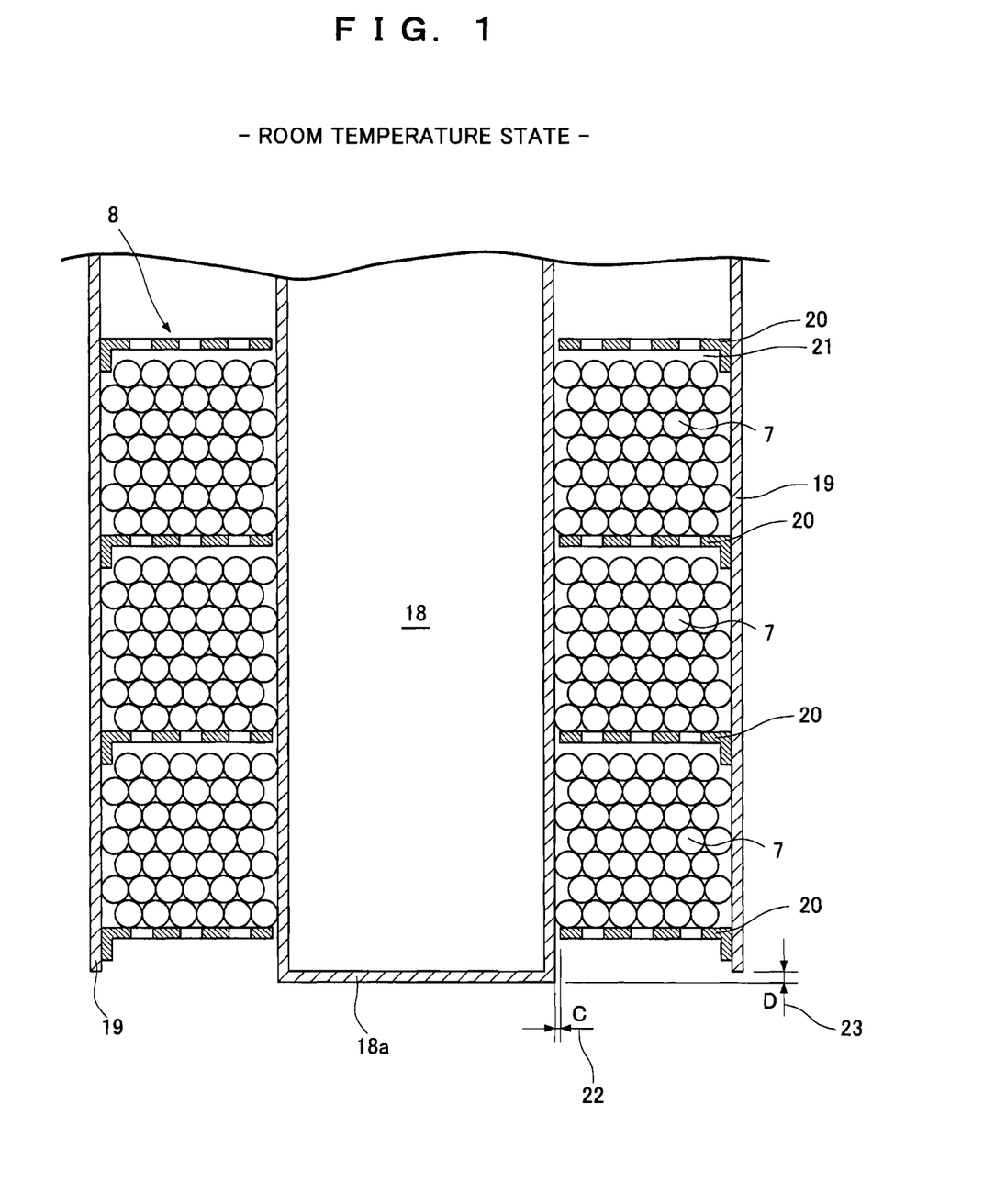
FIG. 1 is a longitudinal section of a reformer in a fuel processor at room temperature according to an embodiment of the present invention.
Figure 2:
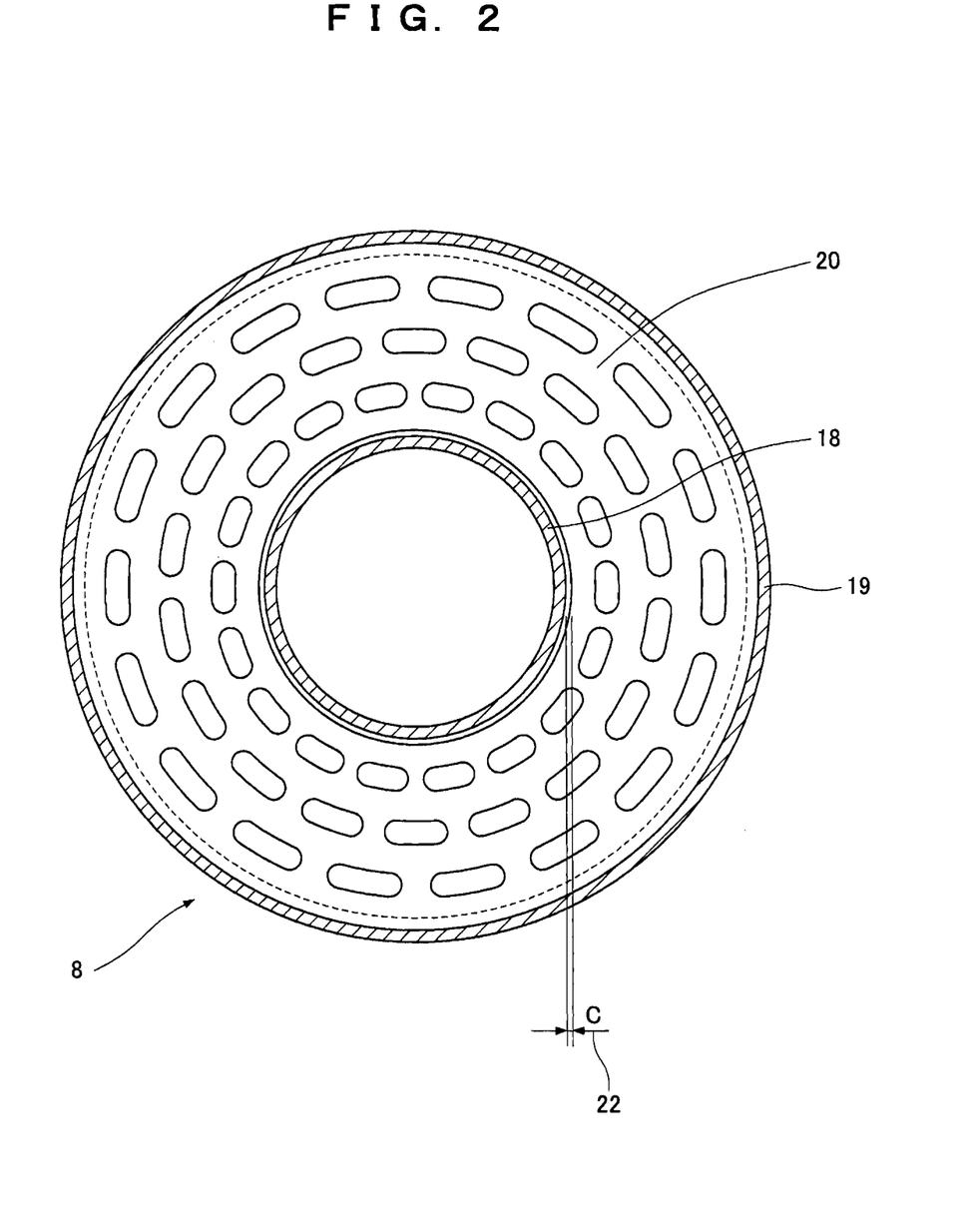
FIG. 2 is a top plan view of a partition plate 20 of the reformer in the fuel processor according to the embodiment of the present invention.

FIG. 1 is a longitudinal section of a reformer 8 at room temperature. FIG. 2 is a top plan view of a partition plate 20. The fuel processor includes an external cylinder 19 that is disposed outside an internal cylinder 18, a heater 5 that heats the interior of the internal cylinder 18, and the reformer 8 filled with a reforming catalyst 7 between the internal cylinder 18 and the external cylinder 19. Fuel gas 70 to be reformed is passed through the reformer 8 to produce hydrogen-rich reformed gas 73 by a reaction of the reforming catalyst 7.

The partition plate 20 has a large number of holes that allow the passage of fuel gas while preventing the reforming catalyst 7 from dropping. In the related art, as shown in FIGS. 11 and 12, the partition plates 20 are attached and fixed to the outer surface of the internal cylinder 18 while a partition plate 20a at the bottom is attached and fixed to the inner surface of the external cylinder 19. The present embodiment is different from the related art in that all the partition plates including the partition plate at the bottom are cantilevered from the external cylinder 19. At this point, a clearance 22 is formed between the internal cylinder 18 and all the partition plates 20 including the partition plate at the bottom, the clearance 22 surrounding the internal cylinder 18. The partition plates 20 are not fixed to the internal cylinder 18. At this point, the clearance 22 has a value of C. A lower end difference 23 between the internal cylinder and the external cylinder has a value of D.

All the partition plates 20 including the partition plate at the bottom are fixed to the external cylinder 19 having a lower temperature than the internal cylinder 18. In this configuration, a distance between the partition plates 20 is determined only by the thermal expansion of the external cylinder 19, preventing the partition plates 20 from coming closer to each other than in an initial state during the operation of the fuel processor. This can prevent a crush caused by a compressive stress applied to the reforming catalyst 7 filled in a catalyst layer 21.

Figure 3:
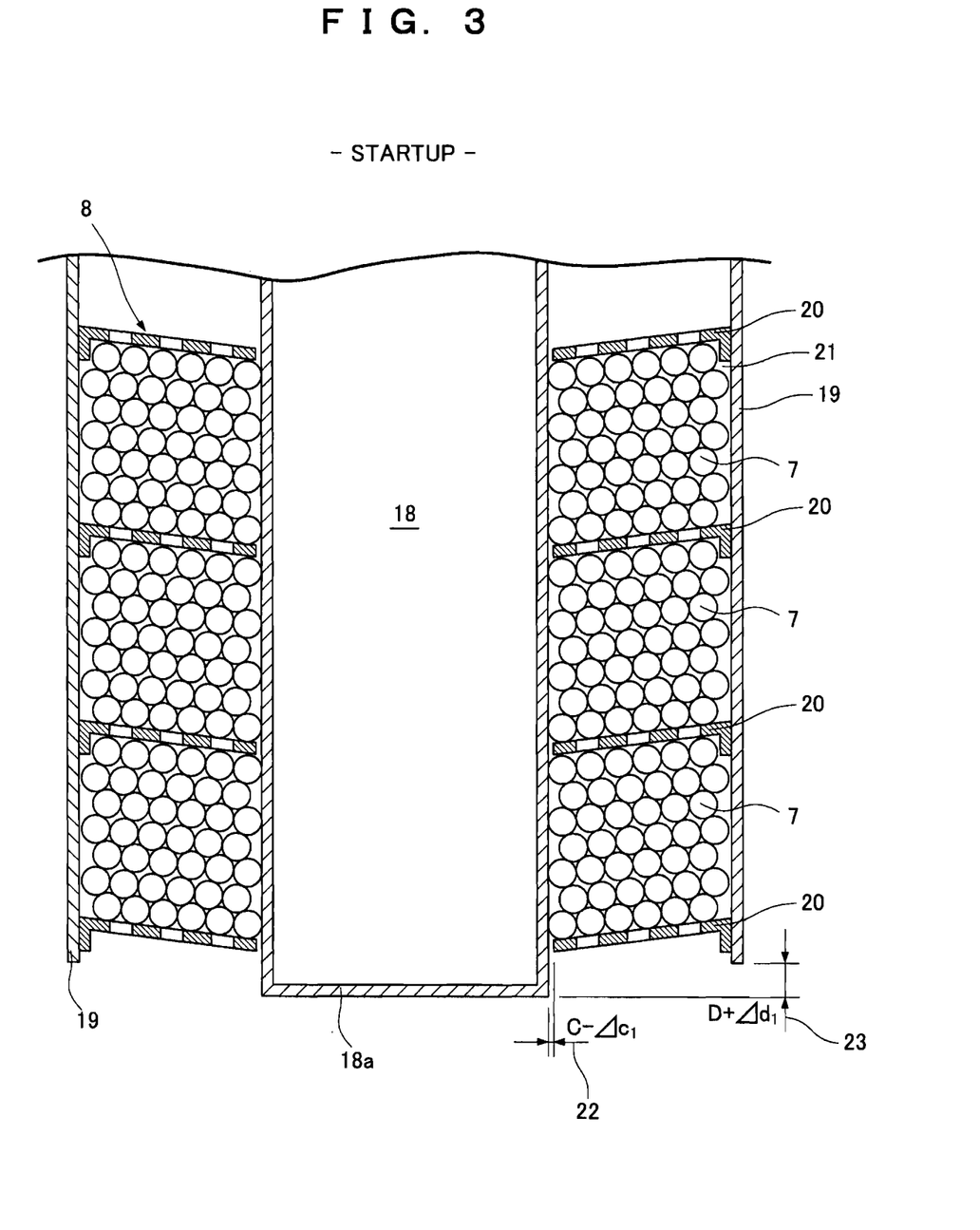
FIG. 3 is a longitudinal section illustrating a state of a temperature increase of the reformer in the fuel processor at the time of the startup of the fuel processor according to the embodiment of the present invention.

FIG. 3 shows a state of the reformer 8 that rises in temperature when the fuel processor is started.

The internal cylinder 18 during startup is rapidly increased in temperature by heat from the center of the internal cylinder 18. Consequently, the internal cylinder 18 expands in the axial direction and the radial direction. The reforming catalyst 7 is then raised in temperature by electric heating into an activated state, enabling an efficient reforming reaction. Similarly, the external cylinder 19 and all the partition plates 20 are also raised in temperature. Consequently, the partition plates 20 and the external cylinder 19 have lower temperatures than the internal cylinder 18.

Hence, a difference in thermal expansion occurs and the clearance 22 is reduced from that of the initial state as follows:

$$C - \Delta c1$$

The lower end difference 23 between the internal cylinder and the external cylinder is increased from that of the initial state as follows:

$$D + \Delta d1$$

The difference in thermal expansion changes the shape of the catalyst layer 21 from that of the initial state in a complicated manner. At this point, the charging state of the reforming catalyst 7 also changes but the reforming catalyst 7 is trapped by friction between catalyst particles or resistance caused by friction between the catalyst particles and the structure, leading to deformation of the partition plates 20. Furthermore, the surface of the reforming catalyst 7 is rubbed into powder by friction. Deformation is mainly caused by the low-temperature side of the structure, and the catalyst layer 21 is less deformed than in the related art. Thus, deterioration such as crushing and powdering of the reforming catalyst 7 is minimized.

Figure 4:
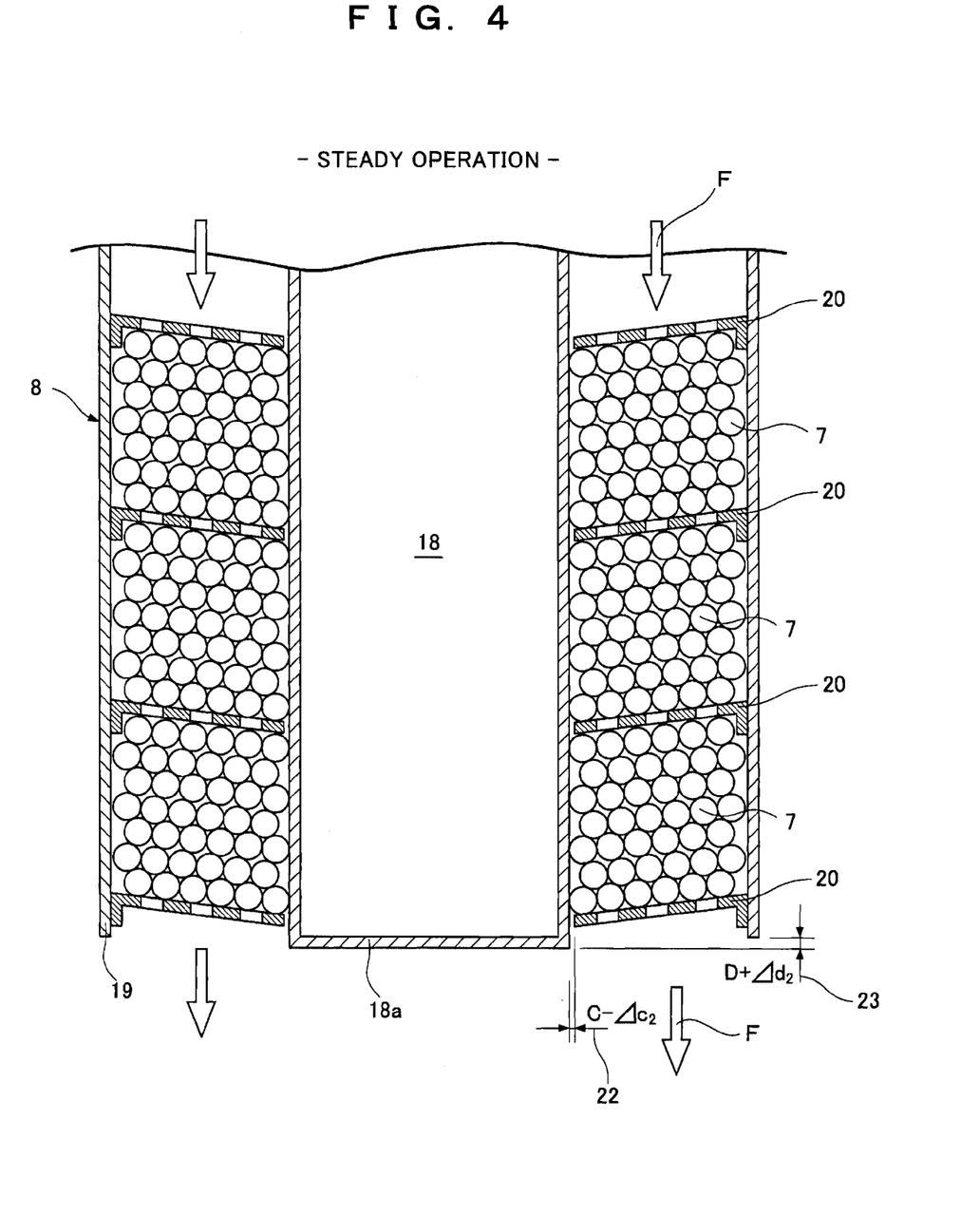
FIG. 4 is a longitudinal section illustrating a state of the reformer in the fuel processor in a steady operation according to the embodiment of the present invention.

FIG. 4 illustrates a state of the reformer 8 in a steady operation.

When the reforming catalyst 7 is sufficiently heated in a steady operation, the fuel gas 70 containing steam is charged into the reforming catalyst 7 and then is steam reformed by the action of the reforming catalyst 7. Since the reforming reaction is an endothermic reaction, the overall reformer 8 is set at a lower temperature than in FIG. 3. This reduces a decrease $\Delta c2$ of the clearance 22 as follows:

$$\Delta c2 < \Delta c1$$

Moreover, an increase $\Delta d2$ of the lower end difference 23 between the internal cylinder and the external cylinder also decreases as follows:

$$\Delta d2 < \Delta d1$$

Hence, a load to the reforming catalyst 7 is maximized during the startup in FIG. 3.

Figure 5:
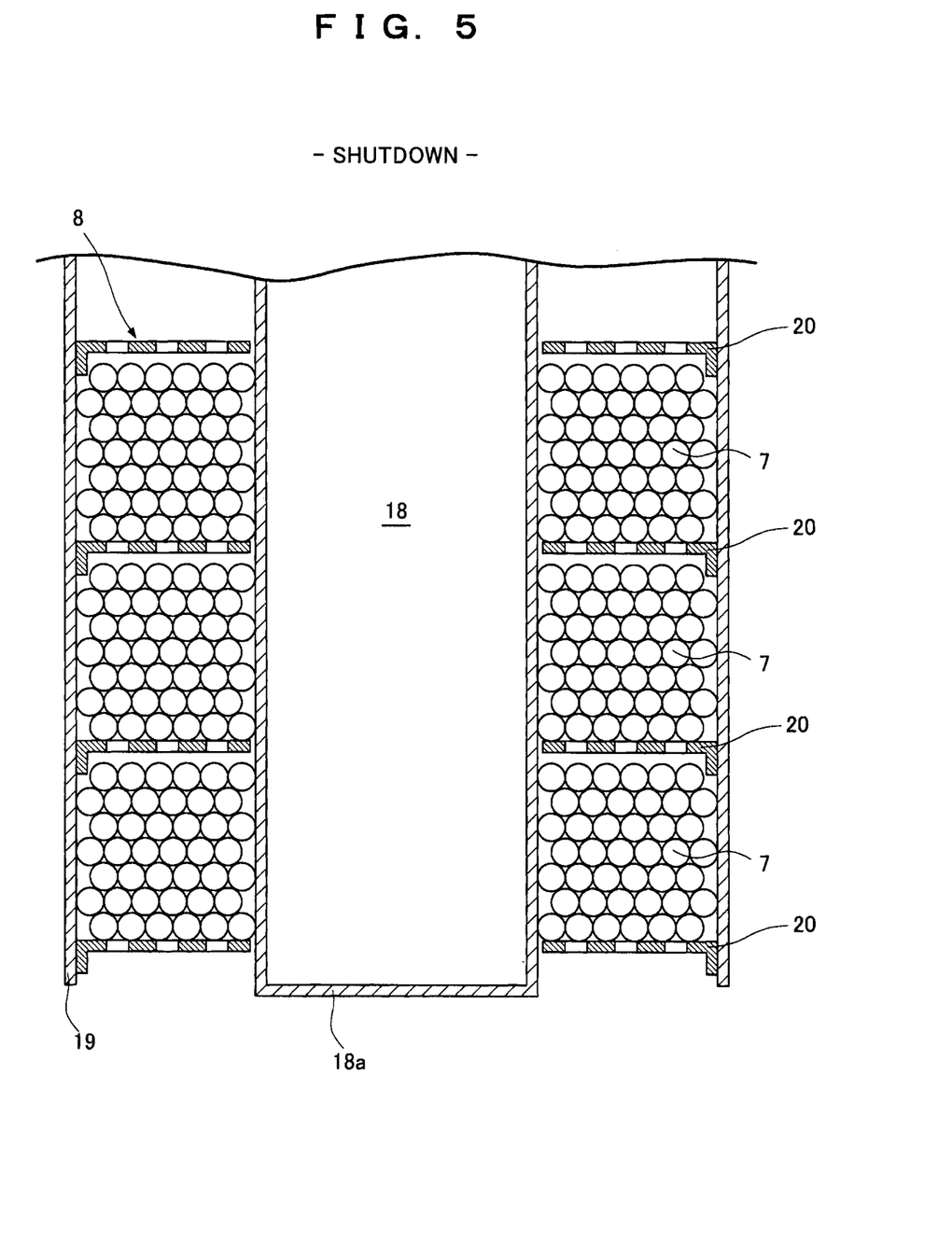
FIG. 5 is a longitudinal section illustrating a state of the stopped reformer in the fuel processor according to the embodiment of the present invention.

FIG. 5 illustrates a state of the stopped reformer 8.

When the overall reformer 8 falls to room temperature, all deformations and the like of the partition plates 20 are eliminated, and the partition plates 20 return to the state of FIG. 1.

In this way, the fuel processor performs the cycle of FIGS. 1 to 5 once a day.

The clearance 22 is provided for two purposes: one is to eliminate resistance when the partition plates 20 fixed to the external cylinder 19 are smoothly inserted to the internal cylinder 18. The other is to prevent the internal cylinder 18 and the partition plate 20 from coming into contact with each other when the structure heated to a high temperature by an operation of the fuel processor is thermally expanded.

In FIG. 1, if the clearance 22 becomes so small that the internal cylinder 18 and the partition plate 20 come into contact with each other, the partition plates 20 are deformed by frictional resistance with the internal cylinder 18, leading to deformation of the catalyst layer 21. Thus, a compressive stress may be applied to the reforming catalyst 7 and deteriorate the catalyst. If the clearance 22 is too large, the particles of the reforming catalyst 7 may drop, though the prevention of a drop of the reforming catalyst 7 is the original purpose of the partition plates. In this case, fuel gas cannot be reformed by the total amount of the reforming catalyst 7, deteriorating reforming performance. Hence, the clearance 22 may be set at a value larger than an approaching distance determined by a thermal expansion difference between the internal cylinder 18 and the partition plate 20 and smaller than a minimum particle size of the reforming catalyst 7. This setting can prevent deterioration of the reforming catalyst 7.

Figure 6:
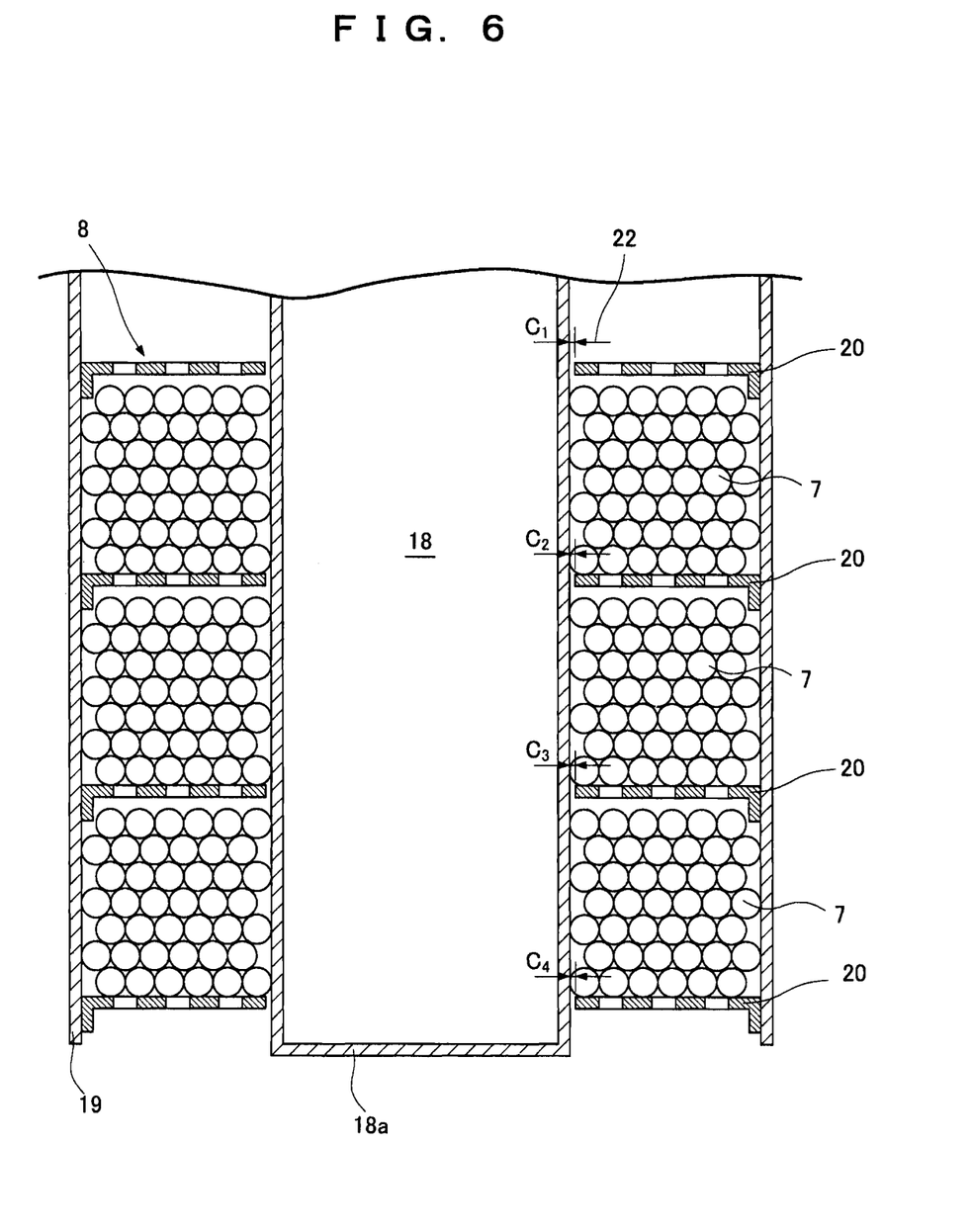
FIG. 6 is a longitudinal section illustrating an internal cylinder 18 having a uniform diameter in the fuel processor according to the embodiment of the present invention.
Figure 7:
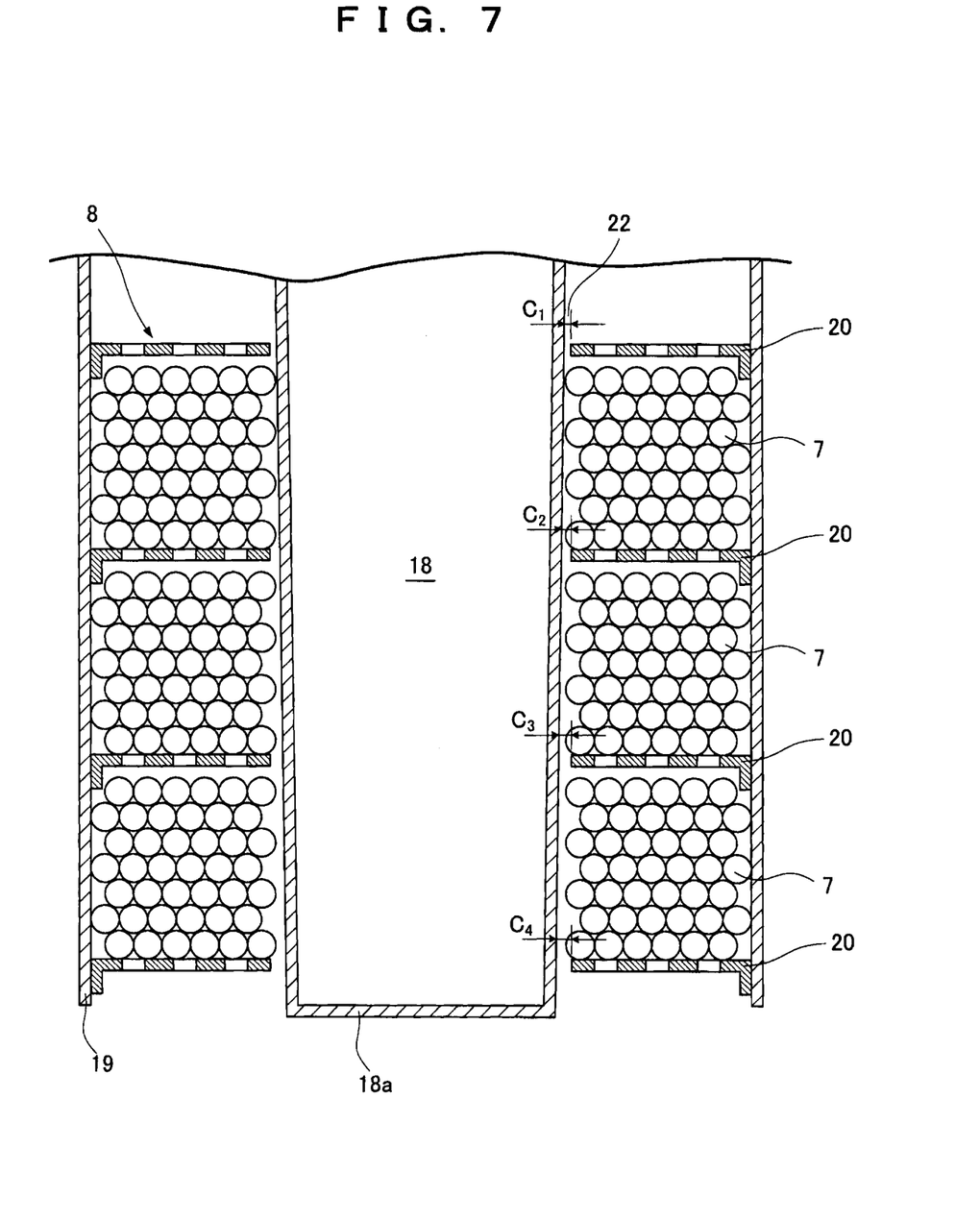
FIG. 7 is a longitudinal section illustrating the tapered internal cylinder 18 in the fuel processor according to the present embodiment of the present invention.

FIGS. 6 and 7 show the detail of a clearance setting when the fuel processor is stopped (room temperature) according to the first embodiment of the present invention.

As shown in FIG. 6, in the case where the internal cylinder 18 has a uniform diameter, the clearance 22 has values $C1$, $C2$, . . . from the top. The relationship of the values in the foregoing range is expressed as below:

$$C1 \leq C2 \leq$$

The internal cylinder 18 rises in temperature toward the bottom in a gravitational direction in an operation of the fuel processor. Hence, the diameter of the internal cylinder 18 increases toward the bottom by thermal expansion. When the fuel processor is stopped, the clearance 22 between a high-temperature part 18a at the bottom of the internal cylinder 18 and the partition plate 20 is set larger than the clearance 22 between a low-temperature part on the top of the internal cylinder 18 and the partition plate 20, thereby preventing the internal cylinder 18 and the partition plate from coming into contact with each other. Thus, deterioration of the reforming catalyst 7 can be prevented.

In many cases, the partition plates 20 are identical components that are easily fabricated by press working. As shown in FIG. 7, the side of the internal cylinder 18 is slightly tapered, in other words, the outside diameter of the internal cylinder 18 decreases toward the bottom. In short, the internal cylinder 18 is tapered such that the outside diameter of the internal cylinder 18 decreases toward the high-temperature part. Thus, the value of the clearance 22 is determined as follows:

$$C1 \leq C2 \leq$$

This configuration can more reliably prevent deterioration of the reforming catalyst 7.

Figure 8:
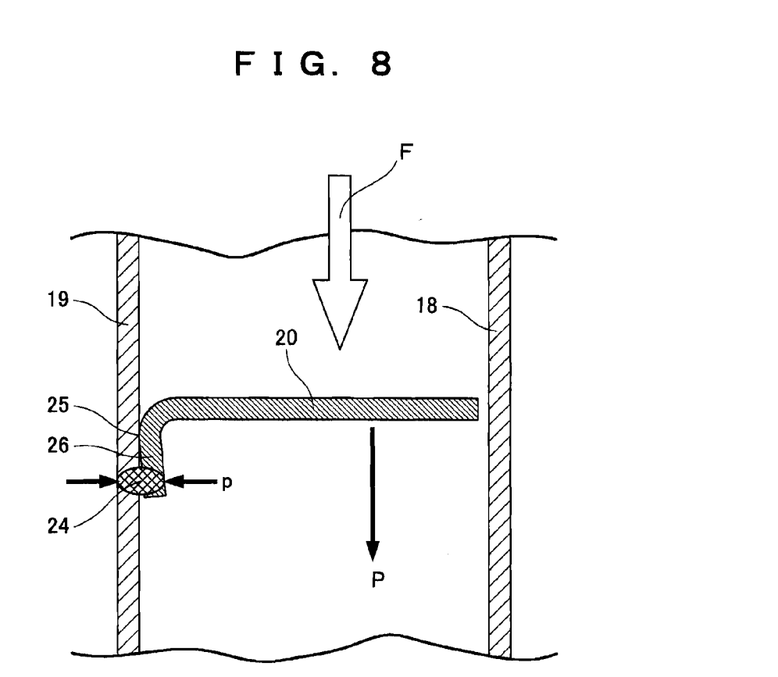
FIG. 8 is an enlarged longitudinal section illustrating a state of the attachment of the internal cylinder 18 according to the embodiment of the present invention.

FIG. 8 specifically illustrates the fixed part of the partition plate 20 and the external cylinder 19.

The partition plate 20 has a flange 26 extended downstream in a flowing direction F of the fuel gas 70 to be reformed, in order to obtain orthogonality relative to the external cylinder 19 and a welded part.

Specifically, the flange 26 directed downward is attached to the external cylinder 19 and then the part of the flange 26 is welded at a welded part 24. At this point, the flange 26 is bent inward relative to the vertical direction. A contact part 25 between the partition plate 20 and the external cylinder may be press-fitted, whereas the welded part 24 may not be in contact with the external cylinder. With this configuration, when a downward force P is applied to the partition plate 20 by, for example, a load to the reforming catalyst 7, the partition plate 20 is deformed from the contact part 25, applying a stress p to the welded part 24 in a direction of compression. Thus, a failure on the welded part 24 is unlikely to develop to faulty welding. Faulty welding may drop the partition plate 20 and the reforming catalyst so as to lead to considerable performance degradation. This structure can prevent faulty welding.

Figure 9:
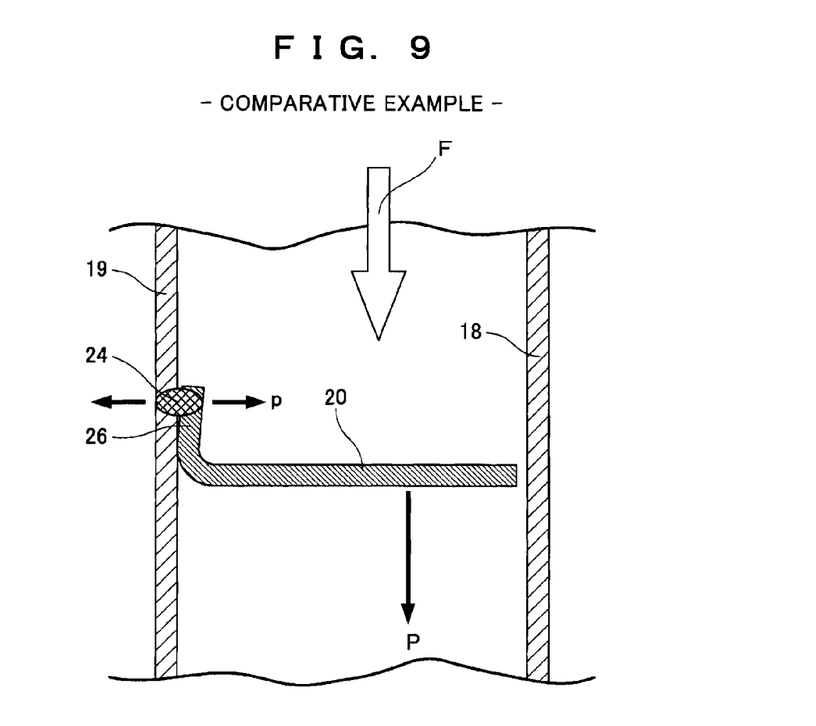
FIG. 9 is an enlarged longitudinal section illustrating a state of the attachment of a comparative example.

FIG. 9 shows a comparative example. In this comparative example, the flange 26 of the partition plate 20 is directed upward. The downward force P to the partition plate 20 applies a tensile stress p to the welded part 24. The tensile stress p may cause faulty welding.

First, the fuel processor including the reformer 8 in FIG. 12 was manufactured for reference, and then an operation test was conducted.

Temperatures were measured from the startup to shutdown of the fuel processor to analyze the deformation of the structure. A minimum distance between the partition plates 20 was reduced by 0.12 mm from the initial state. The fuel processor was started and stopped about 3400 times and then was disassembled for confirmation. In this case, fractures were found on 20.8% of the catalyst.

The fuel processor including the reformer 8 configured as shown in FIGS. 1 to 3 was manufactured, and then an operation test was conducted.

The partition plate 20 cannot be fixed to the external cylinder 19 by a welding method using a typical welding torch because the torch cannot be attached. In the present embodiment, piercing welding is performed from the outer surface of the external cylinder 19 by laser so as to connect all the partition plates 20 to the external cylinder 19. Moreover, all the partition plates 20 are cantilevered from the external cylinder 19. In FIG. 12, the partition plates 20 are fixed to the internal cylinder 18 by spot welding to shorten a tact time. Laser welding is high-speed welding and thus a tact time hardly changes even in spot welding. In the present embodiment, the internal cylinder 18 is entirely seam-welded and hardly drops the partition plates 20 in the event of faulty welding, thereby improving reliability.

Although the partition plates 20 may be fixed to the external cylinder 19 by, for example, caulking instead of welding, repeated thermal shrinkage causes a stress applying an excessive load to the partition plates 20. Thus, as in the present embodiment, welding is desirable for obtaining higher reliability.

In the present embodiment, the internal cylinder 18 had an outside diameter of 53.7 mm and the external cylinder 19 had an internal diameter of 77.8 mm. Temperatures were measured from actual startup to shutdown to analyze the structure. The maximum reduction of the clearance 22 was 0.08 mm on one side when the thermally expanded internal cylinder 18 came close to the partition plates 20. Moreover, the reforming catalyst 7 had a minimum grain size of 0.9 mm and thus the clearance 22 is larger than 0.08 mm and smaller than 0.9 mm. The maximum temperature of the reforming catalyst 7 was set at 680° C. during a continuous operation and repeated starting and stopping operations.

Currently, tests have been conducted in continuous operations up to 1500 hours and in repeated starting and stopping operations up to 600 times. The components of produced gas are not changed by deterioration of catalyst performance or a pressure loss is not caused by catalyst degradation.

INDUSTRIAL APPLICABILITY

The present invention is used for home cogeneration (cogeneration or combined heat and power) systems or fuel cells in base stations for mobile communications, achieving continuous use without replacement while keeping performance in a long, continuous operation.

The invention claimed is:

1. A fuel processor comprising:
   a heater provided with an external cylinder outside an internal cylinder, the heater heating an interior of the internal cylinder; and
   a reformer filled with a reforming catalyst between the internal cylinder and the external cylinder, the fuel processor producing hydrogen-rich reformed gas by passing fuel gas to be reformed through the reformer, by a reaction of the reforming catalyst,
   wherein the reformer filled with the reforming catalyst is divided by a plurality of spaced partition plates in a space between the internal cylinder and the external cylinder in a longitudinal direction of the internal cylinder and the external cylinder, and outer edges of all the partition plates are cantilevered while being connected to the external cylinder.

2. The fuel processor according to claim 1, wherein a clearance is formed between the partition plate and the internal cylinder.

3. The fuel processor according to claim 2, wherein the clearance is larger than an amount of approach in thermal expansion of the internal cylinder and the external cylinder, the thermal expansion being caused by temperature variations during startup and shutdown of the fuel processor, and the clearance is smaller than a minimum grain size of the reforming catalyst.

4. The fuel processor according to claim 3, wherein the clearance between the partition plate and the internal cylinder is larger near a high-temperature part of the internal cylinder than near a low-temperature part of the internal cylinder.

5. The fuel processor according to claim 1, wherein the partition plate has a flange on a fixed part to the external cylinder, the flange being directed downstream in a flowing direction of the fuel gas to be reformed.

6. The fuel processor according to claim 4, wherein the internal cylinder is tapered in side view so as to decrease in outside diameter toward the high-temperature part of the internal cylinder.

7. The fuel processor according to claim 5, wherein the flange of the partition plate is entirely subjected to piecing welding onto the external cylinder.

8. The fuel processor according to claim 1, wherein the reformer is filled with the reforming catalyst to an upper side of a bottom most one of the partition plates.

\* \* \* \* \*